(12) United States Patent
Venkatesan

(10) Patent No.: US 10,782,455 B2
(45) Date of Patent: Sep. 22, 2020

(54) OPTICAL SYSTEM USING CAMERA AND LIGHT SOURCE OF HANDHELD DEVICE

(71) Applicant: Varun Akur Venkatesan, Bangalore (IN)

(72) Inventor: Varun Akur Venkatesan, Bangalore (IN)

(*) Notice: Subject to any disclaimer, the term of this patent is extended or adjusted under 35 U.S.C. 154(b) by 327 days.

(21) Appl. No.: 15/739,994

(22) PCT Filed: Jun. 28, 2016

(86) PCT No.: PCT/IB2016/053846
§ 371 (c)(1),
(2) Date: Dec. 27, 2017

(87) PCT Pub. No.: WO2017/002008
PCT Pub. Date: Jan. 5, 2017

(65) Prior Publication Data
US 2018/0188423 A1    Jul. 5, 2018

(30) Foreign Application Priority Data

Jun. 29, 2015  (IN) .......................... 3260/CHE/2015

(51) Int. Cl.
*G01N 21/59* (2006.01)
*G02B 5/02* (2006.01)
(Continued)

(52) U.S. Cl.
CPC ............ *G02B 5/0236* (2013.01); *G01N 21/59* (2013.01); *G01N 21/8483* (2013.01); *G02B 13/001* (2013.01); *G02B 21/0008* (2013.01); *G02B 27/10* (2013.01); *G01N 21/55* (2013.01); *G01N 2201/0221* (2013.01); *G02B 5/04* (2013.01)

(58) Field of Classification Search
CPC ..... G01N 2021/0112; G01N 2021/015; G01N 2021/0181; G01N 21/55; G01N 21/59; G01N 21/8483; G01N 2201/0221; G02B 5/0231; G02B 5/0236; G02B 5/04; G02B 5/045; G02B 13/001; G02B 13/0055; G02B 13/0065; G02B 13/007; G02B 21/0008;
(Continued)

(56) References Cited

U.S. PATENT DOCUMENTS

2006/0077578 A1* 4/2006 Shimo ...................... G02B 5/04
359/834
2011/0207137 A1* 8/2011 Malik ................ G01N 21/6428
435/6.12
(Continued)

*Primary Examiner* — Ryan S Dunning
(74) *Attorney, Agent, or Firm* — Cynthia Flanigan; Wayne Harper

(57) ABSTRACT

The present invention relates to an optical system for imaging using a camera and a light source of a handheld device, wherein the optical system comprises a transparent optic defining an optical volume, the transparent optic comprising a first main face adapted for positioning an object to be imaged, the transparent optic adapted to admit into the optical volume a light emitted by the light source for illuminating the object and wherein the transparent optic is adapted to admit the light having interacted with the object into the optical volume and turn the light inside the optical volume such that the light is internally reflected within the optical volume and exit the optical volume to be incident onto the camera.

19 Claims, 5 Drawing Sheets

(51) Int. Cl.
  *G02B 13/00*    (2006.01)
  *G02B 27/10*    (2006.01)
  *G01N 21/84*    (2006.01)
  *G02B 21/00*    (2006.01)
  *G01N 21/55*    (2014.01)
  *G02B 5/04*     (2006.01)

(58) Field of Classification Search
  CPC ........ G02B 21/06; G02B 21/26; G02B 21/36;
                              G02B 21/362; G02B 21/365
  USPC .... 348/79, 80; 359/369, 381, 385, 389, 390,
                      359/391, 396, 398; 362/8, 572, 575;
                                                                385/36
  See application file for complete search history.

(56) References Cited

U.S. PATENT DOCUMENTS

2014/0267670 A1*   9/2014   Tipgunlakant ....... G02B 21/361
                                                                348/79
2016/0305926 A1*  10/2016   Rachet ............... G01N 33/4833

* cited by examiner

OPTICAL SYSTEM USING CAMERA AND LIGHT SOURCE OF HANDHELD DEVICE

The invention relates to optical system for imaging an object using a handheld device.

The use of handheld communication devices, such as, mobile phones, tablet computers, personal digital assistant (PDA) have seen tremendous growth. This has provided the potential to reach out to people living in remote areas. The increased reach and has led to the development of various features and applications for end users, such as commerce, banking, healthcare, utilities and the like. For example, mobile apps have been developed for use with mobile phones.

Healthcare services delivered via handheld communication devices have emerged in recent years largely for developing countries. Middle income and especially low-income countries face constraints in their healthcare systems, such as, lack of sufficient human and physical resources. Additionally, the burden of disease is much higher is in middle and low-income countries. Efforts have been put in to explore as to how the high penetration of communication devices can improve such healthcare outcomes as well as generate cost savings. Providing healthcare services via handheld communication devices also provides the advantage of early and easy diagnosis, easy access to healthcare services, tracking of healthcare diseases, medical education and the like.

The object of the invention is to provide an optical system for imaging an object using a handheld device with reduced variations and increased accuracy.

The object of the invention is achieved by an optical system for imaging using a camera and a light source of a handheld device, wherein the optical system comprises a transparent optic defining an optical volume, the transparent optic comprising a first main face adapted for positioning an object to be imaged, the transparent optic adapted to admit into the optical volume a light emitted by the light source for illuminating the object and wherein the transparent optic is adapted to admit the light having interacted with the object into the optical volume and turn the light inside the optical volume such that the light is internally reflected within the optical volume and exit the optical volume to be incident onto the camera.

According to an embodiment, the optical system further comprises a first optical device adapted to optically couple the transparent optic to the camera of the handheld device.

According to another embodiment, the first optical device is adapted to direct the internally reflected light to exit the optical volume.

According to yet another embodiment, the first optical device is adapted to reflect the light incident from the light source such that the light is internally reflected inside the optical volume to illuminate the object.

According to yet another embodiment, the optical system further comprises a second optical device adapted to direct the light from the light source, and a beam splitter adapted to receive the light directed by the second optical device and direct the output light onto the first optical device.

According to yet another embodiment, the transparent optic is adapted to provide an added turn angle to each successive reflections of the light rays with an added turn angle.

According to yet another embodiment, the light is successively internally reflected within the optical volume.

According to yet another embodiment, the optical system further comprises a first turning optic for turning the light having interacted with the object inside the optical volume such that the light is internally reflected within the optical volume.

According to yet another embodiment, the first turning optic comprises an array of geometrical structures for turning the light.

According to yet another embodiment, wherein the array of geometrical structures are prisms. According to yet another embodiment, the optical system further comprises a first reflector for turning the light reflected by the object inside the optical volume such that the light is internally reflected within the optical volume.

According to yet another embodiment, the optical system further comprises a diffuser for optically coupling the first optical coupler with the transparent optic, wherein the light emitted by the light source is directed onto the first main face via the diffuser.

According to yet another embodiment, wherein the light source is one or more from the group consisting of a flash and a display of a handheld device.

According to yet another embodiment, wherein the display is adapted to emit one or more colours responsive to the object to be imaged.

According to yet another embodiment, the optical system further comprises a backlight system for illuminating the object, the backlight system being configured to alter an angle of incidence of the light and limit a cone angle of the light.

According to yet another embodiment, wherein the backlight system comprises a backlight transparent optic comprising a first portion wherein the light is internally reflected within the backlight transparent optic and a second portion for exiting the light out of the backlight transparent optic, a backlight diffuser arranged to receive the light exiting out of the backlight transparent optic, a second turning optic arranged to receive the light exiting from the diffuser and transmit the light by limiting a horizontal cone angle in a horizontal direction, a third turning optic arranged to receive the light transmitted by the second turning optic and transmit the light by limiting a vertical cone angle in a vertical direction, and a turning element arranged to receive the light transmitted by the third turning optic and transmit the light by altering the angle of incidence of the light.

According to yet another embodiment, wherein the second portion comprises an extraction element adapted to uniformly extract the light.

According to yet another embodiment, wherein the backlight system is arranged to receive the light from the light source transmitted through the first transparent optic.

According to yet another embodiment, wherein the backlight system is configured to illuminate the object and the transparent optic is adapted to turn the light transmitted through the object.

The present invention is further described hereinafter with reference to illustrated embodiments shown in the accompanying drawings, in which.

Figure 1:
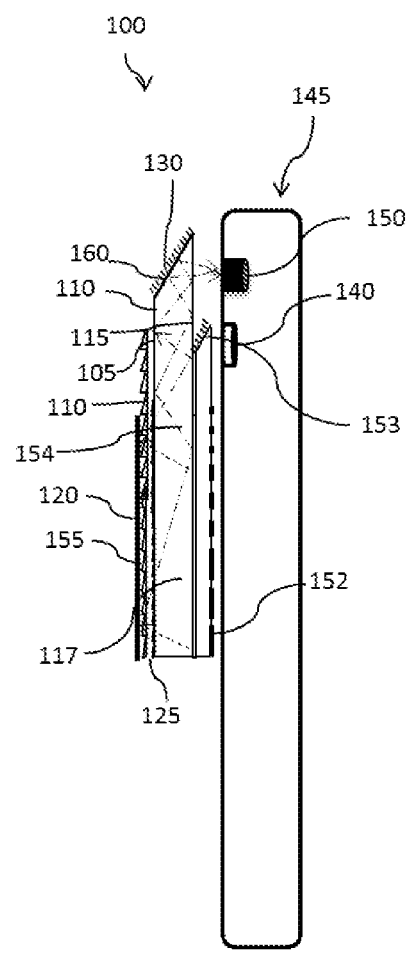
FIG. 1 illustrates an exemplary optical system for imaging an object using a camera and a light source of a handheld device according to an embodiment herein.

FIG. 1 illustrates an exemplary optical system for imaging an object using a camera and a light source of a handheld device according to an embodiment herein. As illustrated, in the example of FIG. 1, the optical system 100 comprises a transparent optic 105 comprising a first main face 110 and a second main face 115 and defining an optical volume 117. The first main face 110 is adapted for positioning the object 120. In the shown example of FIG. 1, the first main face 110 comprises an imaging area 125 and the object 120 is positioned on the imaging area 125 for imaging. In the shown example of FIG. 1, the optical system 110 comprises a first optical device 130 arranged to optically couple the transparent optic 105 to a camera 150 of the handheld device 145. In the shown example of FIG. 1, the handheld device 145 is illustrated as a mobile phone. However, any handheld device comprising a camera, a light source and processing capabilities can be used. The light source 140 may be a flash or a display of the handheld device 145. In the shown example of FIG. 1, the light source 140 is the flash of the handheld device 145. According to an embodiment herein, the optical system 100 may comprise a diffuser 152 for optically coupling the light source 140 to the transparent optic 105. The diffuser 152 comprises a reflector 153 to increase the efficiency of the emitted light being directed into the transparent optic 105. According to an embodiment, in aspects where the display is used as the light source 140, the display may be adapted to emit one or more colours responsive to the object 120 to be imaged. For example, the display may be configured to emit one or more colours for creating a lighting condition suitable for imaging the object 120.

Referring still to FIG. 1, light emitted by the light source 140 is directed onto the transparent optic 105 and passes through the transparent optic 105 to illuminate the object 120 positioned on the imaging area 125. In the shown example of FIG. 1, the light from the light source 140 is directed onto the second main face 115 of the transparent optic 105. The light interacting with the object 120 is reflected by the object 120 and the transparent optic 105 is adapted to admit the reflected light, illustrated as the ray 154. The reflected light undergoes total internal reflections within the transparent optic 105 to propagate inside the transparent optic 105. According to an embodiment herein, the transparent optic 105 is configured to provide an added turn angle to each successive reflections of the reflected light inside the transparent optic 105. This achieves in converting the spatial relationships of the light into angular relationship, thereby providing the advantage of preserving the spatial relationship of the light. In the shown example of FIG. 1, a turning optic 155 is arranged on the transparent optic 105 for providing the added turn angle. In the shown example of FIG. 1, the transparent optic 105 is arranged on the first main face 110 of the transparent optic 105. Use of a turning optic for providing the added turn angle provides the advantage of deploying a flat transparent optic.

Referring still to FIG. 1, according to an embodiment, the turning optic 155 may comprise an array of geometrical structures for turning the light. For example, the geometrical structures may be an array of prisms. The reflected light upon entering the first main face 110 and reaching the turning optic 155 continue into the geometrical structures and is turned with the added turn angle. However, upon exiting the turning optic 155, the reflection of light is determined by the geometry of the second main face 115 and the first main face 110 and may not experience the added turning angle imparted by the turning optic 155. According to one embodiment, the turning optic 155 may be clamped or glued to an existing transparent optic 105 such as a glass window. According to another embodiment herein, the turning optic 155 may be embossed, inscribed or machined into the transparent optic 105. The transparent optic 105 can be implemented using an off the shelf glass, acrylic or any other transparent slab wherein the first main face 110 and the second main face 115 may be parallel to each other. This reduces the cost of the optical system 100 and eases transportation and installation. However, the transparent optic 105 can also be implemented using devices wherein the first main face and the second main face are not parallel, i.e., are at an angle.

The reflected light exists the transparent optic 105 and is directed onto the camera 150 of the handheld device 145 via the first optical device 130 for acquiring an image of the object 120. In the shown example of FIG. 1, the first optical device 130 is a reflector. However, other optical devices for directing light may also be used. This increases the efficiency of direction of the light onto the camera 150. According to one embodiment, an end 160 of the transparent optic 105 proximal to the camera 150 is angled and the first optical device 130 is arranged on the angled end 160 such as to direct the reflected light onto the camera 150.

In the shown example of FIG. 1, the transparent optic 105 is a flat optic wherein the first main face 110 and the second main face 115 are parallel to each other. However, in another embodiment, the transparent optic 105 may be a wedge and the angled main face of the wedge may be used for providing the added turn angle. In yet another embodiment, the transparent optic 105 may be a flat optic with the two ends being angled and optical devices for reflecting arranged on the two angled ends. The optical device at the end proximal to the object 120 is adapted to direct the light reflected by the object 120 inside the transparent optic 105 such that the light undergoes total internal reflections within the transparent optic 105. The optical device at the end proximal to the camera 150 is adapted to direct the light onto the camera 150. In this implementation the angled ends are aligned such that the light reflected by the object 120 is incident onto the optical device at the end proximal to the object 120 and the light reflected by the optical device at the end proximal to the camera 150 is directed onto the camera 150.

Referring still to FIG. 1, the optical system 100 is positioned in front of the camera 150 of the handheld device 145. According to an embodiment herein, the optical system 100 is positioned in front of the camera 150 and the light source 140 of the handheld device 145. For example, the optical system 100 may be molded or made in an enclosure that fits the handheld device 145. For example, the enclosure may be a casing such that the optical system 100 is positioned in front of the camera 150 of the handheld device 145. According to another embodiment, the optical system 100 may comprise a press fit clamp for clamping the optical system 100 at the right position. In another implementation, one or more magnetic elements may be used to position the optical system 100 in front of the camera 150 of the handheld device 145. The magnetic elements provide the advantage of guided fitment of the optical system 100. The optical system 100 may also be fixed to the casing of the handheld device 145.

According to another embodiment, guided fitment may be achieved by providing the user a visual or audio feedback.

Visual feedback may be provided either by illuminating a light source to a desired brightness upon correct fitment. Another method could be using visual cues via software to display on the screen to aid the user to appropriately position the optical system 100 to the mobile phone.

Figure 2:
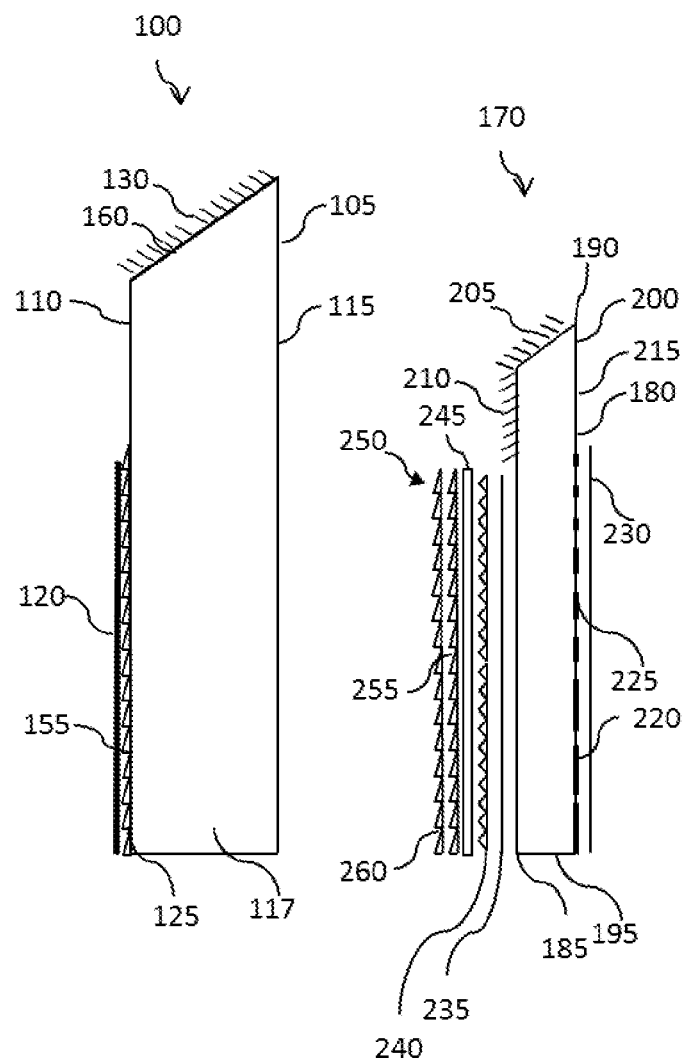
FIG. 2 illustrates an exemplary optical system for imaging an object using a camera and a light source of a handheld device according to another embodiment herein.

FIG. 2 illustrates an exemplary optical system for imaging an object using a camera and a light source of a handheld device according to another embodiment herein. In the shown example of FIG. 2, the optical system 100 comprises a transparent optic 105 comprising an imaging area 125 for positioning the object 120 to be imaged. A turning optic 155 is arranged on the transparent optic 105 for providing the added turn angle to the light reflected by the object 120. According to an embodiment, the optical system 100 comprises a backlight system 170 for illuminating the object 120 positioned on the transparent optic 105. The backlight system 170 comprises a backlight transparent optic 175 comprising a first main face 180 and a second main face 185 and ends 190, 195 and defining an optical volume. Light from light source (for example, the light source 140 in FIG. 1) of a handheld device (for example, the handheld device 145 in FIG. 1) is incident onto the first main face 180 of the backlight transparent optic 175 at a location 200. The backlight transparent optic 175 is configured to admit the light incident at the location 200. According to an embodiment, the location 200 is proximal to the end 190 of the backlight transparent optic 175. According to an embodiment, the end 190 is angled and reflectors 205, 210 are arranged to prevent wastage of light. The reflectors 205, 210 are configured to reflect the light into the backlight transparent optic 175. The light in internally reflected between the two ends 190 and 195 of the backlight transparent optic 175 within a first portion 215 and exits the backlight transparent optic 175 when the light reaches a second portion 220 of the backlight transparent optic 175. According to an embodiment, the second portion comprises an extraction element 225 for exiting the light from the backlight transparent optic 175 through the second main face 185. For example, the extraction element comprises a lambertian pattern to uniformly extract light.

Referring still to FIG. 2, according to an embodiment herein, a reflective film 230 is arranged along the first main face 180 of the backlight transparent optic 175 to prevent light from escaping from the first main face 180. The light exiting the backlight transparent optic 175 via the second main face 180 is incident on a backlight diffuser 235. The light exiting out of the backlight diffuser 235 is incident onto a second turning optic 240. The second turning optic 240 is configured to receive the light exiting the light exiting out the backlight diffuser 235 and transmit the light by limiting a horizontal cone angle of the light in a horizontal direction. The light transmitted by the second turning optic 240 is incident onto a third turning optic 245 and the third turning optic 245 is configured to transmit the light by limiting a vertical cone angle of the light in a vertical direction. Thus, the second turning optic 240 and the third tuning optic achieves in limiting the horizontal cone angle and the vertical cone angle of the light. For example, the second turning optic 240 and the third turning optic 245 comprises geometrical structures to limit the cone angle. According to an embodiment, the geometrical structures may be prismatic structures. The third turning optic 245 may be rotated by 90 degrees to so that the vertical cone angle can be limited. The light transmitted by the third turning optic 245 is incident onto a turning element 250. The turning element 250 is configured to receive the light and transmit the light by altering an angle of incidence of the light. In the shown example of FIG. 2, the turning element comprises two turning optics 255, 260 for turning the light. The turning optics 255, 260 cumulatively alter the angle of incidence of the light. In certain implementation, the altering of the angle of incidence of the light may be achieved using only one or more turning optics. The angle of incidence is altered to provide a tilt angle to the light. The altering of the angle of incidence of the light by the turning element 250 provides the advantage of increasing contrast by reducing scattering of the light caused by the turning optic 155. Thus, light from the light source (for example, the light source 140 in FIG. 1) of the handled device (for example, the handheld device 145 in FIG. 1) is made into a backlight for high contrast illumination of the object 120 for imaging the object. The light reflected from the object 120 propagates in a manner as described in FIG. 1 and is directed onto a camera (for example, the camera 150 in FIG. 1) for acquiring the image of the object 120.

Figure 3:
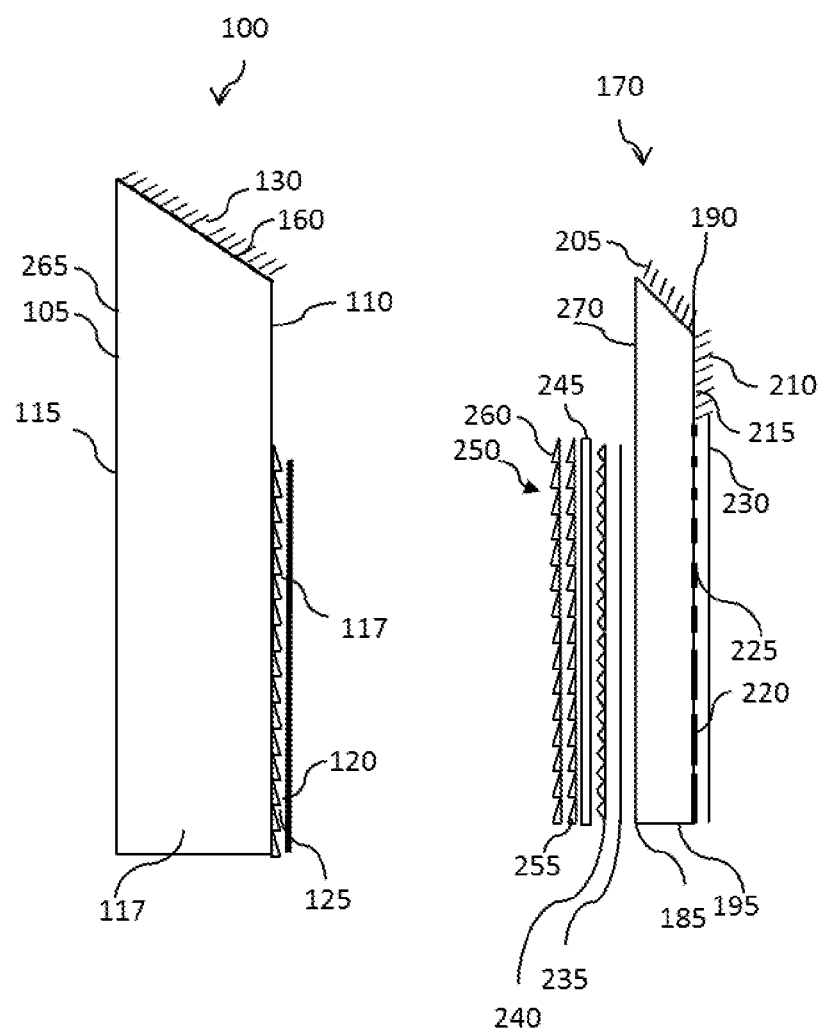
FIG. 3 illustrates an exemplary optical system wherein transmission of light through an object is to be imaged according to an embodiment herein.

FIG. 3 illustrates an exemplary optical system wherein transmission of light through an object is to be imaged according to an embodiment herein. In the shown example of FIG. 3, the backlight system 170 is arranged so as to illuminate the object 120 such that light transmitted through the object is imaged. Light from a light source (for example, the light source 140 in FIG. 1) of a handheld device (for example, the handheld device 145 in FIG. 1) is directed onto a second main face 115 of the transparent optic 105 at a location 265. For example, the light from the light source may be directed via an optical coupler optically coupling the light source to the transparent optic 105. The light incident onto the second main face 115 is admitted inside the transparent optic 105 and exits the first main face 110 of the transparent optic 105. The light exiting the transparent optic 105 is admitted onto the backlight transparent optic 175 of the backlight system 170 via the second main face 185 at a location 270. The reflectors 205, 210 are configured to reflect the light into the backlight transparent optic 175. The light in internally reflected between the two ends 190 and 195 of the backlight transparent optic 175 within a first portion 215 and exits the backlight transparent optic 175 when the light reaches a second portion 220 of the backlight transparent optic 175. According to an embodiment, the second portion comprises an extraction element 225 for exiting the light from the backlight transparent optic 175 through the second main face 185. For example, the extraction element comprises a lambertian pattern to uniformly extract light.

Referring still to FIG. 3, according to an embodiment herein, a reflective film 230 is arranged along the first main face 180 of the backlight transparent optic 175 to prevent light from escaping from the first main face 180. The light exiting the backlight transparent optic 175 via the second main face 180 is passes though the backlight diffuser 235, the second turning optic 240, the third turning optic 245, the turning element 250 in a manner described in FIG. 2 and is incident onto the object 120 to illuminate the object 120. The light transmitted through the object 120 is incident onto the transparent optic 105 and undergoes total internal reflections within the transparent optic 105 to propagate inside the transparent optic 105. The turning optic 155 is arranged on the transparent optic 105 for providing the added turn angle. The reflected light exists the transparent optic 105 and is directed onto a camera (for example, the camera 150 in FIG. 1) of a handheld device (for example, the handheld device 145 in FIG. 1) for acquiring the image of the object 120.

Figure 4:
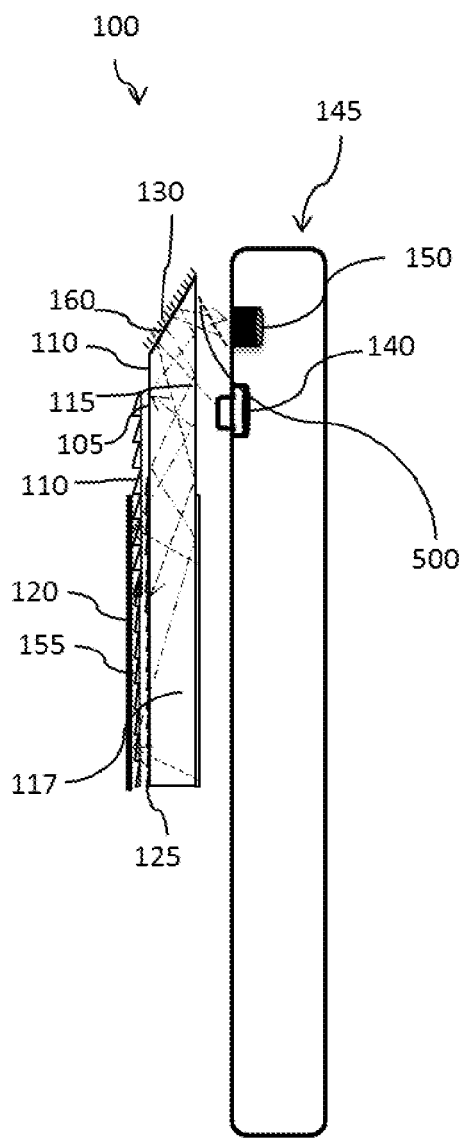
FIG. 4 illustrates an exemplary optical system for imaging an object using a camera and a light source of a handheld device according to another embodiment herein.

FIG. 4 illustrates an exemplary optical system for imaging an object using a camera and a light source of a handheld device according to another embodiment herein. In the shown example of FIG. 4, a portion of the light emitted by the light source 140 may be incident onto a first optical device 130. This is achieved because the light emitted by the light source 140 may comprises a wide cone angle. The first optical device 130 reflects the incident light so that the light is internally reflected within the transparent optic 105 to be incident onto the object 120.

Figure 5:
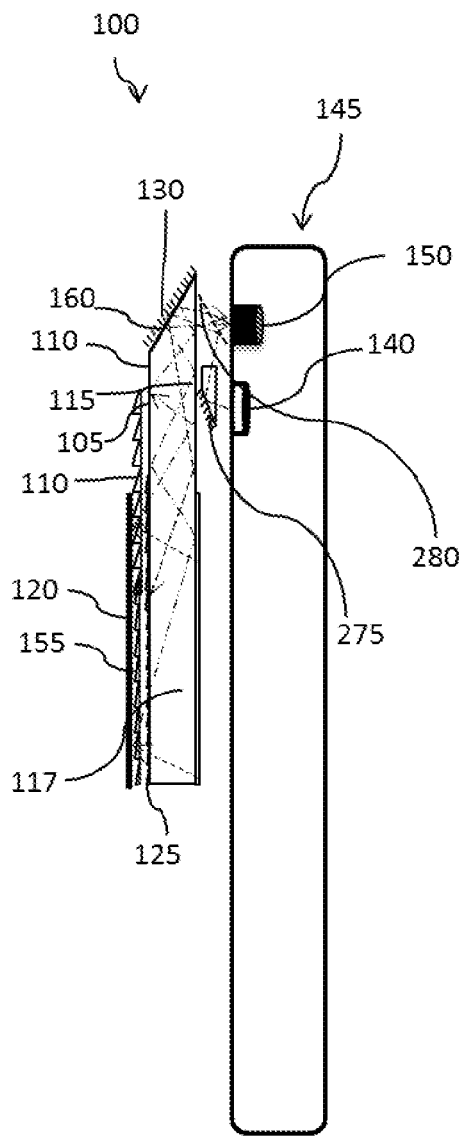
FIG. 5 illustrates an exemplary optical system for imaging an object using a camera and a light source of a handheld device according to another embodiment herein.

FIG. 5 illustrates an exemplary optical system for imaging an object using a camera and a light source of a handheld device according to another embodiment herein. In the shown example of FIG. 5, the optical system 100 comprises a second optical device 275 and a beam splitter 280. The second optical device 275 is adapted to direct the light from the light source 140 onto the beam splitter 280. The beam splitter 280 is adapted to receive the light directed by the second optical device 275 and direct the output light onto the first optical device 130 so that the light is internally reflected within the transparent optic 105 to be incident onto the object 120. For example, the second optical device 275 may be a reflector. The beam splitter 280 is adapted to function in the reverse principle of a beam splitter and the output of the beam splitter 280 is in accordance with the reverse principle.

The embodiments described herein provide the advantage of imaging an object using a camera and a light source of a handheld device. The handheld device may be a mobile phone, a tablet computer, or any other handheld device comprising a camera, a light source and processing capabilities. The optical system may be built as a single unit and can be annexed with a handheld device. Moreover, the handheld device provides the advantage of increasing the contract of light source for illuminating the object so that an image with an increased contrast can be acquired. The embodiments described herein may be used for scanning colorimetric strips barcodes, visiting cards and the like. For example, colorimetric strips may relate to medical fields like pregnancy, ovulation, urine testing and saliva testing. Colorimetric strips relating to water quality may also be imaged for testing water quality. They can also be used to scan surfaces for color matching in textiles, painted surfaces, make up material etc.

I claim:

1. An optical system for imaging using a camera and a light source of a handheld device, the optical system comprising:
    a transparent optic defining an optical volume, the transparent optic comprising a first main face adapted for positioning an object to be imaged, the transparent optic adapted to allow a light emitted by the light source to pass through and exit the transparent optic for illuminating the object; and
    wherein the transparent optic is adapted to admit a reflected light having interacted with the object into the optical volume and turn a reflected light from the object inside the optical volume such that the reflected light undergoes total internal reflections within the optical volume and exits the optical volume to be incident onto the camera.

2. The optical system according to claim 1, further comprising a first optical device adapted to optically couple the transparent optic to the camera of the handheld device.

3. The optical system according to claim 2, wherein the first optical device is adapted to direct the internally reflected light to exit the optical volume.

4. The optical system according to claim 2, wherein the first optical device is adapted to reflect the light incident from the light source such that the light is internally reflected inside the optical volume to illuminate the object.

5. The optical system according to claim 4, further comprising:
    a second optical device adapted to direct the light from the light source; and
    a beam splitter adapted to receive the light directed by the second optical device and direct the output light onto the first optical device.

6. The optical system according to claim 1, wherein the transparent optic is adapted to provide an added turn angle to each successive reflection of the light rays with an added turn angle.

7. The optical system according to claim 1, wherein the light is successively internally reflected within the optical volume.

8. The optical system according to claim 1, comprising a first turning optic for turning the reflected light from the object inside the optical volume such that the reflected light is internally reflected within the optical volume.

9. The optical system according to claim 8, wherein the first turning optic comprises an array of geometrical structures for turning the light.

10. The optical system according to claim 9, wherein the array of geometrical structures are prisms.

11. The optical system according to claim 1, comprising a first reflector for turning the reflected light by the object inside the optical volume such that the light is internally reflected within the optical volume.

12. The optical system according to claim 1, further comprising a diffuser for optically coupling a first optical coupler with the transparent optic, wherein the light emitted by the light source is directed onto the first main face via the diffuser.

13. The optical system according to claim 1, wherein the light source is one or more from the group consisting of a flash and a display of a handheld device.

14. The optical system according to claim 13, wherein the display is adapted to emit one or more colours responsive to the object to be imaged.

15. The optical system according to claim 1, further comprising a backlight system for illuminating the object, the backlight system being configured to alter an angle of incidence of the light and limit a cone angle of the light.

16. An optical system for imaging using a camera and a light source of a handheld device, the optical system comprising:
    a transparent optic defining an optical volume, the transparent optic comprising a first main face adapted for positioning an object to be imaged, the transparent optic adapted to admit into the optical volume a light emitted by the light source for illuminating the object, wherein the transparent optic is adapted to admit a reflected light having interacted with the object into the optical volume and turn the reflected light from the object inside the optical volume such that the reflected light undergoes total internal reflections within the optical volume and exits the optical volume to be incident onto the camera; and
    a backlight system for illuminating the object, the backlight system being configured to alter an angle of incidence of the light and limit a cone angle of the light;
    wherein the backlight system comprises:
    a backlight transparent optic comprising a first portion wherein the light is internally reflected within the backlight transparent optic and a second portion for exiting the light out of the backlight transparent optic;

a first turning optic for turning the reflected light from the object inside the optical volume such that the reflected light is internally reflected within the optical volume;
a backlight diffuser arranged to receive the light exiting out of the backlight transparent optic;
a second turning optic arranged to receive the light exiting from the diffuser and transmit the light by limiting a cone angle in a first direction;
a third turning optic arranged to receive the light transmitted by the second turning optic and transmit the light by limiting a cone angle in a second direction perpendicular to the first direction; and
a turning element arranged to receive the light transmitted by the third turning optic and transmit the light by altering the angle of incidence of the light.

17. The optical system according to claim 16, wherein the second portion comprises an extraction element adapted to uniformly extract the light.

18. The optical system according to claim 16, wherein the backlight system is arranged to receive the light from the light source transmitted through the first transparent optic.

19. The optical system according to claim 16, wherein the backlight system is configured to illuminate the object and the transparent optic is adapted to turn a light transmitted through the object.

* * * * *